Figure 1:
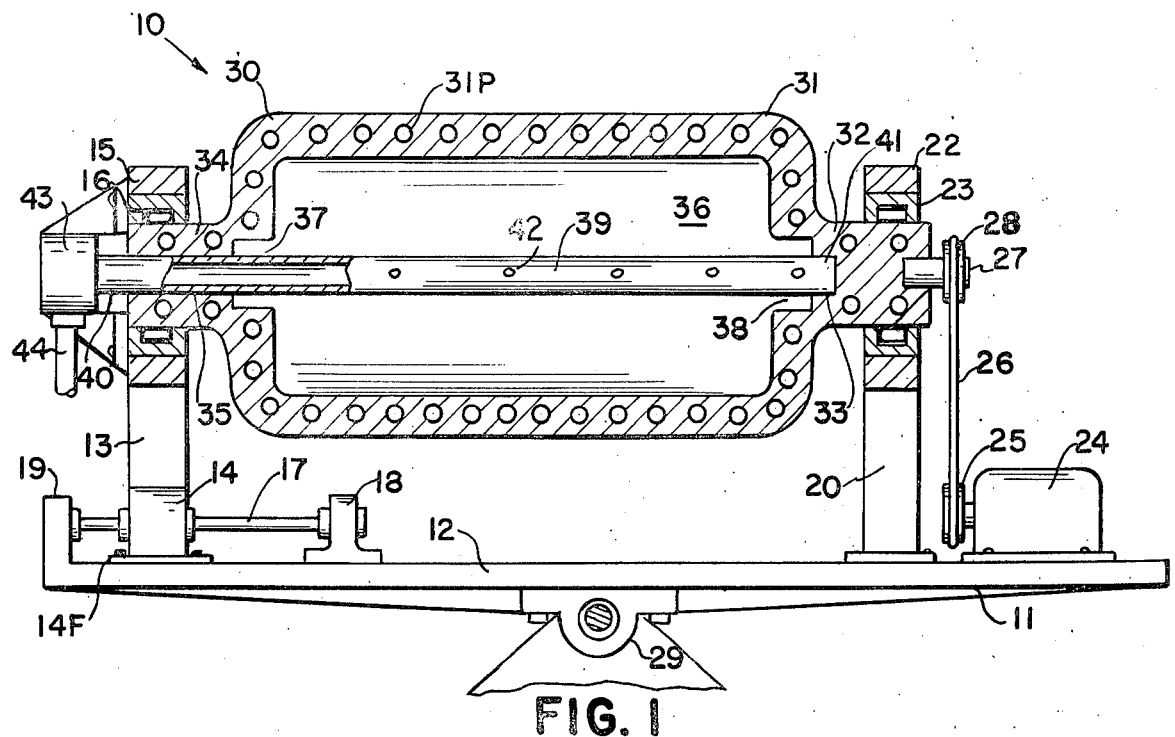

United States Patent
Lemelson

[11] 4,123,307
[45] Oct. 31, 1978

[54] METHOD FOR FORMING HOLLOW SHELLS BY ROTATIONAL CASTING AND WINDING THEREON

[76] Inventor: Jerome H. Lemelson, 85 Rector St., Metuchen, N.J. 08840

[21] Appl. No.: 731,799

[22] Filed: Oct. 12, 1976

Related U.S. Application Data

[63] Continuation-in-part of Ser. No. 547,621, Feb. 6, 1975, Pat. No. 4,043,721, Continuation of Ser. No. 300,248, Oct. 24, 1972, Pat. No. 3,875,275, which is a continuation of Ser. No. 744,048, Jul. 1, 1968, abandoned, Continuation-in-part of Ser. No. 612,719, Sep. 12, 1975.

[51] Int. Cl.$^2$ ............................................. B29C 2/00
[52] U.S. Cl. .................... 156/172; 156/156; 156/245; 264/45.7; 264/46.7; 264/311
[58] Field of Search ............... 156/156, 172, 245, 242, 156/74, 500; 264/311, 310, 46.7, 45.7; 425/435; 220/3.1 B

[56] References Cited

U.S. PATENT DOCUMENTS

| | | | |
|---|---|---|---|
| 2,945,693 | 7/1960 | Way | 156/242 |
| 3,031,720 | 5/1962 | Rempel et al. | 264/311 |
| 3,041,699 | 7/1962 | Daniel | 425/435 |
| 3,449,182 | 6/1969 | Wiltshire | 156/272 |
| 3,875,275 | 4/1975 | Lemelson | 264/46.7 |

*Primary Examiner*—Douglas J. Drummond
*Assistant Examiner*—Michael W. Ball

[57] ABSTRACT

An apparatus and method are provided for forming large filament reinforced composite bodies. In one form a substrate is formed by rotational molding a plastic material in a mold cavity after which the molding is removed from the cavity and placed in a filament winding fixture wherein filamentary material is wound thereon to provide substantial reinforcement for the article and strengthen the outer stratum thereof. In a particular form, the rotational molding contains a rigid tubular member extending therethrough and secure therein during the rotational molding process and is utilized for the purpose of supporting the rotational molding in the filament winding fixture. In another form, an inflatable substrate is constructed with a rod or tubular member extending therethrough which member is utilized to support the inflated member in a filament winding fixture. Plastic and filamentary material are disposed against the inflated outer surface of the inflatable member in a winding operation which forms a hard, filament reinforced shell on its outer surface. In a particular form, a hard plastic material is spray deposited or otherwise formed on the outer surface of the inflated member while it is rotated in a fixture and after a self supporting shell is formed thereof, glass fibers or other filamentary material is wound against the hard shell as it is rotated in a filament winding fixture.

10 Claims, 2 Drawing Figures

U.S. Patent  Oct. 31, 1978  4,123,307

METHOD FOR FORMING HOLLOW SHELLS BY ROTATIONAL CASTING AND WINDING THEREON

RELATED APPLICATIONS

This is a continuation-in-part of Ser. No. 547,621 filed Feb. 6, 1975, now U.S. Pat. No. 4,043,721 as a continuation of Ser. No. 300,248 filed Oct. 24, 1972, now Pat. No. 3,875,275 which is a continuation of application Ser. No. 744,048 filed July 1, 1968, now abandoned. This is also a continuation-in-part of Ser. No. 612,719 filed Sept. 12, 1975.

SUMMARY OF THE INVENTION

This invention relates to an apparatus and method for forming large hollow bodies such as containers of composite wall structures, the walls of which are filament reinforced. Such containers may serve as storage means for a variety of liquids such as water, oil, gasoline or other chemicals.

It is known in the art to form a hollow body such as a container by winding a plurality of filaments on a preform and depositing a plastic resin along with the wound filaments to provide a shell formed of hardened resin and filaments. The technique requires the fabrication of a preform from a plurality of components usually involving the stampting, rolling or spinning of sheet metal to form a body of revolution and the welding of a number of components together including a retention means for the preform to complete its structure. The result is a relatively costly preform structure, all or part of which is expended in the manufacture of the filament wound article thereon.

The instant invention is concerned with the manufacture of articles of manufacture using filament winding techniques and preform structures which are relatively simple to manufacture at substantially lower cost than the conventional preform and are also subject to variations in shape which are easily attainable with little if any fabrication and assembly operations required to produce the preform. The preform is formed by means of a rotational molding technique wherein a tubular member is supported across the cavity of a rotational mold and is employed not only to fabricate the preform and form part thereof but also to support the preform in the subsequent filament winding and wall buildup operations. In one form the tubular member or support extending across the rotational mold is specifically designed together with the filament winding apparatus to permit the composite molded article to be supported and power rotated by the filament winding apparatus without further fabrication thereto.

Accordingly, it is a primary object of this invention to provide a new and improved apparatus and method for forming composite hollow bodies.

Another object is to provide an apparatus and method for forming preforms which may be utilized in the formation of large containers and the like by filament winding techniques.

Another object is to provide a method of forming a composite body by filament winding using a preform wherein the fabrication of the preform is substantially simplified.

Another object is to provide an apparatus and method for filament winding a preform which is made of a flexible material which is supported by a rigid member and inflation of said flexible material during filament winding thereof.

Another object is to provide a molding and filament winding apparatus which is adjustable to accomodate different molds and winding preforms.

Another object is to provide a filament winding apparatus using preforms for winding filaments onto which preforms are simple in structure and low in cost to produce.

Another object is to provide a combined apparatus for forming a preform by molding a shell onto a shaft or tube, removing the molding from the molding and reinforcing same by filament winding without removing the shaft from the fixture on which the molding thereon is molded.

With the above and such other objects in view as may hereafter more fully appear, the invention consists of the novel constructions, combinations and arrangements of parts and methods as will be more fully described and illustrated in the drawings, but it is to be understood that changes, variations and modifications may be resorted to which fall within the scope of the invention as claimed.

Figure 2:
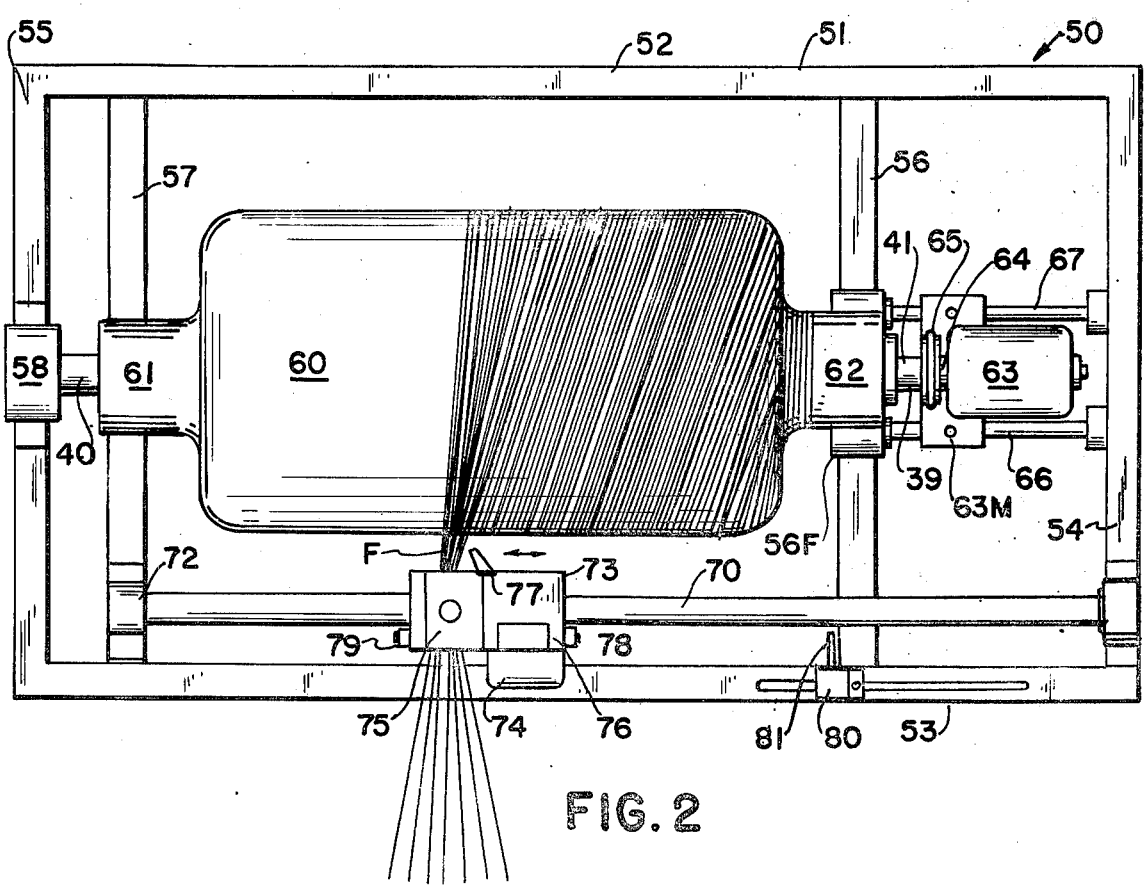

With the above and such other objects in view as may hereinafter more fully appear, the invention consists of the novel constructions, combinations and arrangements of parts and method as will be more fully described and illustrated in the accompanying drawings, but it is to be understood that changes, variations and modifications may be resorted to which fall within the scope of the invention as claimed:

In the drawings:

FIG. 1 is a side view with parts broken away for clarity of part of a molding apparatus for rotationally casting a large hollow or internally reinforced body, such as a container or tank, structural member or other shape with a reinforcing member extending longitudinally through the center of the casting; and FIG. 2 is a top view of a filament winding apparatus employing a molding of the type produced by means of the apparatus of FIG. 1.

The instant invention is drawn to a two-step process together with apparatus for performing same wherein a large hollow body or one which is internally reinforced with a filler material and a structural member or assembly of structural elements, is formed in a casting machine employing a mold which is rotated about an axis while the axis is varied with respect to the horizontal so that a molding or casting material such as a thermoplastic or thermosetting resin charged into the mold cavity forms a hollow body thereof. A rigid structural member, such as a tube, rod or assembly of elements, is disposed across the casting mold and is supported in sub-cavities in the mold wall so that it becomes affixed to the large hollow body and rigidly supports same thereon. End portions of the rigid member or assembly either protrude outwardly from the molding when it is removed from the mold or are provided with cavities or a passageway therethrough to which a power rotated spindle or shaft and a free wheeling shaft may be respectively coupled for rotating the molding, when it is removed from the mold, about an axis. A filament or plurality of filaments are wound against the outside surface of the molding in a filament winding machine or fixture defining the second step of the process which includes the use of a binder or encapsulating material such as a self-setting resin to form a composite body having an outer surface or shell which is filament reinforced. The molding, which serves as a winding preform, may also define the insulating interior of the container or shape formed in part by filament winding thereon and the structural member extending longitudinally therethrough, if shaped as a tube, may serve a number of functions including that of introducing molding material into the mold or interior of the molding shell during the molding operation and the additional functions of filling and removing liquid contents from the filament wound container plus that of serving as a longitudinal reinforcement for the composite molded and filament wound structure.

In FIG. 1 is shown a molding apparatus 10 including an assembly 11 having a rigid platform 12 to the bottom of which is attached one or more pillow blocks or bearings 29 for tilting the platform during a rotational molding operation thereon as disclosed in my copending patent application Ser. No. 547,621. Supported above the platform 12 are a pair of upright supporting fixtures 13 and 20. The upper end 15 of fixture 13 contains a roller bearing 16 while the upper end 22 of fixture 20 supports a second roller bearing 23. The roller bearings 16 and 23 rotatably support respective extensions 34 and 32 of the end walls of a rotational mold 30 formed of two half sections, one of which 31 is shown in FIG. 1 while the other, not shown, is removably assembleable to 31 and defines an enclosed molding cavity 36 therewith.

An elongated tubular member 39, such as a stainless steel pipe, extends longitudinally across the mold and contains openings 42 therein through which one or more molding materials, such as plastic resins, may be flowed to cavity 36, during a molding operation.

One end 41 of the tube 39 is supported within a subcavity 33 which extends into the protruding portion 32 of the mold, while the other end 40 of the tube extends through a passageway 35 extending through the protruding portion 34 of the mold and protrudes outwardly therefrom wherein it is connected to a rotary coupling 43 to which one or more inlet lines 44 are connected from one or more supplies of casting or molding liquid. For further details of the supply means for the casting liquid, reference is made to said copending application Ser. No. 547,621. Notations 37 and 38 refer respectively to subcavities surrounding portions of the tube 39, in which subcavities protruding portions of the molding are cast to provide additional support for the molding on the tube as illustrated in FIG. 2.

As set forth in application Ser. No. 547,621, the molding which is formed within the cavity 36 may comprise a self-supporting shell of a rigid or flexible plastic such as a polyethylene, polypropylene, polyurethane, polyester, polyvinyl chloride, cellulose acetate, polyamide, acetyl or other suitable thermoplastic or thermosetting resin, a predetermined quantity of which may be charged into the mold before the mold is closed or introduced through the openings 42 in the tubular member 39. The molding may also comprise a composite body having an outer shell formed first by rotational casting when the mold rotates and its rotational axis is predeterminately varied and one or more inner shells formed of cellular and noncellular plastic materials which are charged into the interior of the outer shell through the openings 42 in the tubular member and either completely fill the interior of the outer shell or form a shell-like structure against the inside surface thereof by rotationally casting same thereagainst.

Depending on whether the molding fluid is a thermosetting or a thermoplastic resin, hot or cold liquid may be pumped through a spiral passageway or a series of passageways 31P extending around the assembled mold or respectively through the mold halves and may be introduced and removed from said passageway or passageways as disclosed in application Ser. No. 547,621 as the mold is rotated.

A constant or controlled speed electric motor 24 is shown supported on the top of the platform 12 and is connected to rotate the mold by means of a pulley 25 connected to the shaft thereof, a belt 26 extending around pulley 25 and a second pulley 28 which is connected to a pin or shaft 27 extending outwardly from the end portion 32 of the mold 30 and fixed to at least one of the mold halves.

In FIG. 1, the fixture 13 is shown longitudinally adjustable with respect to the fixture 20 by supporting a plurality of slide bearings 14 connected to the bottom of the fixture 13 for sliding movement along a track 17 composed of at least two rigid rods which are supported at their ends by brackets 18 and 19. Fasteners 14F extend through holes in the base of the fixture 13 and through slotted holes (not shown) in the platform 12 and serve to secure the fixture 13 at any adjusted location between the brackets 18 and 19 so as to permit molds of different lengths to be supported between the fixtures 13 and 20 on the platform 12.

In FIG. 2, a molding 60 of the type which is molded within the cavity 36 of the mold 30 of FIG. 1, is shown having the protruding end portions 40 and 41 of the tubular member 39 respectively supported within a free wheeling live center or bearing 58 and to the shaft 64 of a constant speed gear motor 63 by means of a coupling 65. The motor 63 is supported on a mount 63M which is adjustably positionable along tracks 66 and 67. A supporting frame 51 for the filament winding apparatus 50 of FIG. 2 includes longitudinal structural members 52 and 53 joined by lateral structural members 54 and 55 and such frame also supports laterally extending structural members such as beams 56 and 57 which extend parallel to each other and are connected at their ends to the longitudinal structural beams 51 and 53. Beam 56 supports a fixture 56F supporting the ends of the track rods 66 and 67 while the other ends of said rods are supported by the frame member 54. The motor 63 may thus be longitudinally adjustable in location to accommodate moldings or preforms 60 of different lengths within the winding fixture. Notations 61 and 62 refer to respective portions of the molding 60 which support the shaft 39, which portions may remain as part of the filament wound structure or be cut therefrom if desired.

Filament winding is effected by means of a carriage 73 which is driven by a reversible gear motor 74 supported thereby, back and forth along a track 70 which is supported at its ends respectively by the structural members 54 and 57 of the supporting frame 51. The carriage 73 includes a guideway 75 for a plurality of reinforcing filaments F which are fed from respective supplies thereof such as respective spools of glass, metal or ceramic filamentary materials or respective openings of a die through which the filamentary material is extruded to shape. The carriage 73 includes a mount 76 for a dispensing nozzle 77 which mount may include a reservoir for liquid resin, such as polyester resin and a catalyst which is mixed therewith when pumped through the nozzle 77 to be dispensed against the filaments F as they are wound against the molding 60. A suitable remote supply of such resin and catalyst may be connected to the mount 76 by means of a flexible hose.

The back and forth movement of the carriage 77 to effect spiral winding of the filaments F is controlled by limit switches 78 and 79 which is supported at the ends of the carriage 73. Limit switch 78 has an actuator which operates the switch to reverse the operation of gear motor 74 when said actuator engages a pin 81 protruding from a mount 80 supported by the longitudinal frame member 53 so that the degree of longitudinal travel of the carriage 73 along the track 70 may be adjusted by adjustably locating the mount 80 and clamping same against structural member 53 at the desired location by means of a fastener. The actuator of switch 79 is operated to cause the switch to reverse the operation of motor 74 when said actuator engages the mount 72 at the end of track 70. The switches 78 and 79 are thus operated to cause the carriage 73 to travel back and forth along the length of the central portion of the molding or casting 60 to wind filaments fed therethrough against either said central portion and/or portions of the end portions 61 and 62 of the molding depending on the desired configuration. An automatic controller such as a counter or other device may be operated by either or both the switches 78 and 79 to stop the motor 74 after it has driven the carriage 73 back and forth across the molding 60 a predetermined number of times. Suitable known means for maintaining the filaments F under a desired degree of tension as they are wound around the molding 60 are provided within the guide 75 for said filaments.

In a particular form of the invention, it is noted that the apparatus of FIG. 1 may be employed for filament winding the molding formed in the mold 30 by suitably designing the mold and the elongated support or tubular member 39 so that the mold may be removed from the molding while the ends of the tubular member 39 are retained in modified forms of the bearings 16 and 23 so that filament winding may be effected against the molding by means of a suitable winding carriage of the type shown in FIG. 2 which is supported by a track supported above the platform 12 and operative as described. In such a form of apparatus, the mold would clampingly engage protruding portions of the tubular member 39 and be removable therefrom after the material rotationally cast in the mold cavity has properly set to form a hollow body of the desired configuration whereafter the mold halves are separated from each other and removed from the molding and tubular member 39 which is retained within the end bearing coupled to the motor rotating shaft 27 so that further operation of the motor 24 may be utilized to rotate the shaft 39 and the molding formed thereon in a filament winding operation of the type described. In another form of the invention, the above-described filament winding operation may be effected while one or more materials are charged through the tubular member into the mold and rotationally cast therein as winding progresses so as to reduce the total cycle time necessary to form a composite molding formed of a shell, a cellular plastic or second molding material molded in situ against the inside of the shell and filaments wound against the outside of the shell and encapsulated within a plastic disposed thereon during winding.

In yet another form of the invention, it is noted that a preform may be provided which is formed of any suitable material and is supported at its ends between powered and free wheeling fixtures. During a filament winding operation of the type described, insulating material such as a self-expanding cellular plastic resin is charged into the preform through one end thereof of a tubular member of the type provided in FIGS. 1 and 2, and is caused to form a coating against the inside surface of the preform which is utilized to support or insulate same wherein such coating sets while the winding operation progresses so that the combined operations of internally supporting and insulating the resulting container and filament reinforcing the outer surface thereof may be effected simultaneously so as to reduce total cycle time.

In the last few examples provided above, if it is desired to form a coating inside the molded shell or preform by means of rotational casting, the winding equipment may be mounted on the platform 12 and may tilt therewith during the casting and winding operations so as to properly distribute the molding material about the interior surface of the preform or rotationally cast shell.

In yet another form of the invention, the wall of the hollow body formed by molding in the rotational mold of FIG. 1 may either be made of rigid material which is so thin as to offer insufficient self support during filament winding to be prevented from buckling or inwardly deforming or may be made of a flexible plastic resin which deforms during winding. If such is the case, a fluid such as air or other gas may be introduced into the hollow body and maintained therein under sufficient pressure during filament winding or at least the initial part of filament winding until the rigidizing plastic applied through nozzle 77 has solidified to support the wall of the preform. Such pressurized gas may be introduced thru the tube 39 while at least one end thereof is closed off to prevent its escape. Hot curing or cold setting gas may also be introduced through tube 39 during the molding operation to effect solidification of the molding plastic against the wall of the mold.

In yet another form of the invention, a composite hollow body is formed by gas pressurizing and inflating a flexible bag or envelope which is formed of a rotational molding or fabricated of heat sealed or cemented plastic sheeting or laminate thereof and disposing an automatically operated lay-up manipulator within the inflated structure, then automatically operating the manipulator to cause it to deposit a self hardening material as a layer against the inside surface of the inflated wall and hardening or solidifying same thereon. The lay-up material may comprise a plastic resin such as a polyester or epoxy resin or a portland cement and may be sprayed, extruded or otherwise flowed against the inside surface of the inflated enclosure to form a solid, self supporting layer or coating of predetermined thickness thereon. Reinforcing filaments may also be applied to form reinforcements for the coating material by flowing short lengths thereof with the liquid resin or cement lay-up material sprayed or otherwise applied to the inside of the inflated wall. If the inflated structure is semi-spherical or cylindrical in shape when it is inflated, the lay-up manipulator may be supported at the center of the inflated structure either from above on a fixture which passes through a sealed opening in the top wall of the inflatable wall or from below on a fixture supported by the ground or bottom wall of the structure supported by the ground or a fixture on which it is mounted. In such arrangement, the deposition head for the lay-up material is supported on an arm which is controlled in pivotal rotary movement to cause said head to predeterminately scan and deposit material to form a layer thereof on the inside surface of the inflated wall or walls of the preform. After a hard shell is so formed, the inflated envelope may be removed or retained on the hardened shell and additional lay-up material may be sprayed or otherwise applied to the outside surface of the shell or preform.

In yet another form of the invention, an inflatable structure is formed of sections of plastic film which are heat sealed or cemented together to provide side walls thereof which have a double wall structure which, when inflated, may provide a rigid structure by flowing a self hardening material such as portland cement or concrete or a plastic resin between the double wall portions thereof wherein the material is retained therebetween until it hardens providing a rigid core portion or portions of the inflatable structure which may be deflated thereafter or have the remaining unsupported wall portions covered with a plastic resin or cement by spray-lay-up means as described. If used per se, the self hardening material which is poured or cast in between the double wall portions of the structure may form rib-like reinforcing and supporting rigid formations therein.

I claim:

1. A method of forming a composite article comprising the steps of:
    forming a hollow preform by disposing a structural member across a cavity of a mold, introducing a molding material into said mold cavity and causing said molding material to form a hollow body wherein the opposite end portions of said structural member are integrally secured to respective opposite wall portions of said hollow body during the molding procedure by the solidification of said molding material against said structural member and wherein said opposite end-portions of said structural member are accessible to the exterior of said hollow body,
    removing said hollow body with said structural member secured thereacross from said mold and disposing said structural member with the hollow body thereon between the centers of a filament winding fixture with the opposite end-portions of said structural member providing rotational support on said fixture for said hollow body and wherein said structural member defines an axis of rotation for said hollow body,
    thereafter power rotating said hollow body on said filament winding fixture while simultaneously winding at least one flexible reinforcing member around at least a portion of the outside surface of said hollow body and bonding said reinforcing member to said outside surface to form a composite body composed of said hollow body, said structural member, and said reinforcing flexible member wound thereon in integral assembly therewith.

2. A method with accordance with claim 1 wherein said structural member is inserted in said mold in such a manner that the end portions of said structural member protrude beyond the opposite walls of said hollow body formed in said mold and wherein said protruding end portions are thereafter supported for rotation by said filament winding fixture.

3. A method in accordance with claim 1 wherein said molding material forms a hollow body which is self supporting and defines a rigid structure on said structural supported member such that it does not deform when filament winding is effected thereon.

4. A method in accordance with claim 1 wherein said hollow body is formed with a flexible side wall, said method further including applying gas pressure to the interior of said hollow body to support said flexible side wall of said hollow body during at least the initial part of the filament winding operation so as to predetermine the shape of said composite body.

5. A method in accordance with claim 1 wherein said hollow body is formed with a flexible side wall during rotational molding, which flexible side wall is capable of being inwardly deformed during the filament winding operation, further including applying gas pressure to the interior of said hollow body during the initial part of the filament winding operation to internally support said flexible side wall and wherein said bonding is effected by depositing a liquid resin on the outside of said hollow body with said filamentary material and solidifying said resin in situ on said filamentary material to form a rigid outer shell of the rotationally molded hollow body, resin and filamentary material.

6. A method in accordance with claim 1 wherein said structural member which is disposed across the cavity of said rotational mold comprises a hollow tube, said method further including introducing a fluid into said hollow body through said tube.

7. A method in accordance with claim 6 wherein the fluid introduced through said tube into said hollow body is operable to internally support said hollow body during filament winding.

8. A method in accordance with claim 6 which includes closing one end of said tube, said fluid comprising additional molding material.

9. A method in accordance with claim 6 wherein said fluid introduced into said hollow body is caused to form a lining on the inside surface of the initial molding material introduced into said hollow body.

10. A method of forming a composite article comprising the steps of:
    forming a hollow preform by disposing a structural member across the cavity of a rotational mold, introducing a molding material into said mold cavity and rotating said mold between centers of a rotating fixture while predeterminately varying the axis of rotation of said mold to cause said molding material to become distributed completely around the surface of said mold cavity and against portions of said structural member disposed near opposite walls of said mold cavity and solidifying said molding material in said cavity to form a hollow body thereof which is secured by molding to said structural member,
    thereafter removing said rotational mold from said hollow body while retaining said hollow body on said structural member disposed between the centers of said rotating fixture,
    thereafter reinforcing the wall of said hollow body by winding a filamentary material around the outside surface thereof while rotating said hollow body on said said structural member between said centers of said rotating fixture.

* * * * *